United States Patent [19]
Engel et al.

[11] 4,228,680
[45] Oct. 21, 1980

[54] DEVICE FOR DETECTING THE ONSET OF FUEL INJECTION

[75] Inventors: Gerhard Engel, Stuttgart; Wessel, Wolf, Oberriexingen, both of Fed. Rep. of Germany

[73] Assignee: Robert Bosch GmbH, Stuttgart, Fed. Rep. of Germany

[21] Appl. No.: 964,846

[22] Filed: Nov. 29, 1978

[30] Foreign Application Priority Data

Feb. 8, 1978 [DE] Fed. Rep. of Germany ....... 2805175

[51] Int. Cl.[3] ....... G01M 19/00
[52] U.S. Cl. ....... 73/119 A
[58] Field of Search ....... 73/119 A; 123/32 SA, 123/32 SJ

[56] References Cited

U.S. PATENT DOCUMENTS

| | | | |
|---|---|---|---|
| 3,344,663 | 10/1967 | Dreisin et al. | 73/119 A |
| 3,412,602 | 11/1968 | Rush et al. | 73/119 A |
| 3,596,507 | 8/1971 | Oshima et al. | 73/119 A |

*Primary Examiner*—Jerry W. Myracle
*Attorney, Agent, or Firm*—Edwin E. Greigg

[57] ABSTRACT

A signal transducer for use in association with a fuel injection valve of an internal combustion engine to detect the moment of commencement of fuel injection. The axial position of the fuel valve needle is sensed and a proportional signal is applied to a signal differentiator which generates therefrom an output signal with a substantially steeper initial slope. This signal is easier to evaluate with respect to the onset of fuel injection than the direct transducer signal which has relatively low absolute amplitudes and whose amplitude increases only very slowly at the moment of opening of the injection valve.

9 Claims, 2 Drawing Figures

DEVICE FOR DETECTING THE ONSET OF FUEL INJECTION

FIELD OF THE INVENTION

The invention relates to the fuel injection valves of internal combustion engines. More particularly, the invention relates to a device for detecting the moment at which a fuel injection valve opens and fuel is beginning to be supplied to the engine, either via the induction manifold or directly into the combustion chambers. Still more particularly, the invention relates to a detector which includes a transducer located in the vicinity of the injection valve for generating an electrical signal related to the opening of the fuel injection valve.

In a known device for controlling the onset of fuel injection in Diesel engines, there is provided a valve needle position detector which generates the actual value signal for the injection controller. The signal from the valve needle position detector is applied to a threshold switch whose output signal is fed to the injection controller.

It is a distinct disadvantage of the known apparatus that relatively low amplitudes of the signals generated by the valve needle position detector require the threshold switch to respond to very low signal levels. Accordingly, the entire device is subject to disturbing influences, for example those due to temperature changes, drift and the effects of aging, all of which result in imprecise fuel delivery and operation of the engine.

OBJECT AND SUMMARY OF THE INVENTION

It is thus a principal object of the present invention to provide a device for detecting the opening of a fuel injection valve, i.e., the onset of fuel injection, which is improved with respect to the known art by being less susceptible to external disturbances and permitting the use of high level thresholds which are easier to maintain precisely. This object is attained according to the invention by providing a differentiating element which receives the signal from the valve needle position detector and generates a differentiated electrical signal which is then used to trigger a timing circuit or a signal threshold switch. It is a particular advantage of the device according to the invention that the differentiated electrical signal exhibits a substantially steeper signal edge than the transducer signal and thus the moment of the onset of fuel injection can be detected more rapidly and more precisely.

In an advantageous additional feature of the invention, a signal holding circuit is provided in association with the differentiating circuit or the threshold switch which prevents the generation of spurious signals due to the non-monotonic signal generated by some position transducers.

The electromechanical transducers may be of inductive, capacitive or piezoresistive type and may include strain gauge detectors.

The invention will be better understood as well as further objects and advantages thereof become more apparent from the ensuing detailed description of a preferred exemplary embodiment taken in conjunction with the drawing.

DESCRIPTION OF THE PREFERRED EMBODIMENT

Figure 1:
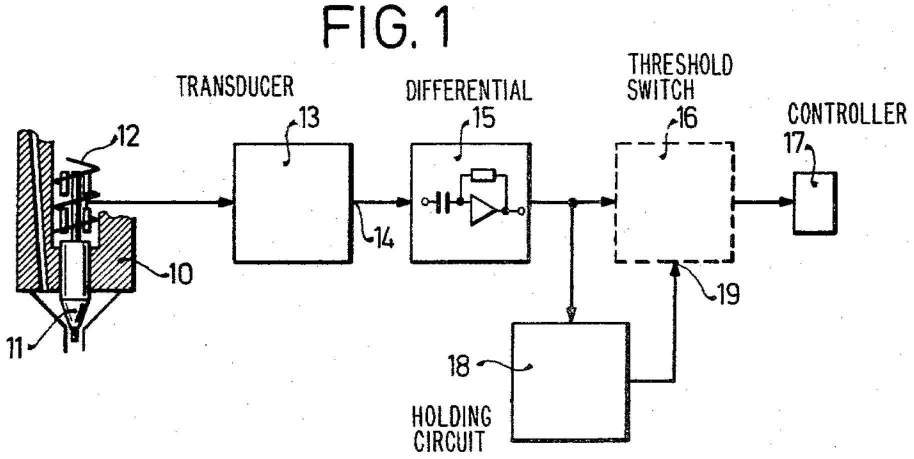
FIG. 1 is a schematic block diagram of a device constructed according to the present invention.

Turning now to FIG. 1, there will be seen a block circuit diagram representing a device for detecting the onset of fuel injection according to the present invention. A typical fuel injection valve is shown partially and schematically at the numeral 10. The valve 10 has an axially movable valve needle 11 which is lifted from its seat by a mechanism, not shown, for the purpose of injecting fuel. The axial motions of the valve needle 11 are detected by an inductive valve needle position detector 12 which generates an electrical signal that is fed to a transducer circuit 13. The output of the transducer circuit 13 is a signal whose amplitude or some other characteristic is proportional to the axial stroke of the valve needle and which is delivered at the output 14. This signal is then fed to a differentiating circuit 15 which, in turn, is connected to, for example, a threshold switch 16 (processing circuit) whose output finally goes to a controller 17 which controls the onset of fuel injection. An electrical holding circuit 18 is provided for maintaining a particular signal present at the output of the differentiator 15. The output of the holding circuit 18 goes to a separate input 19 of the threshold switch 16.

Figure 2:
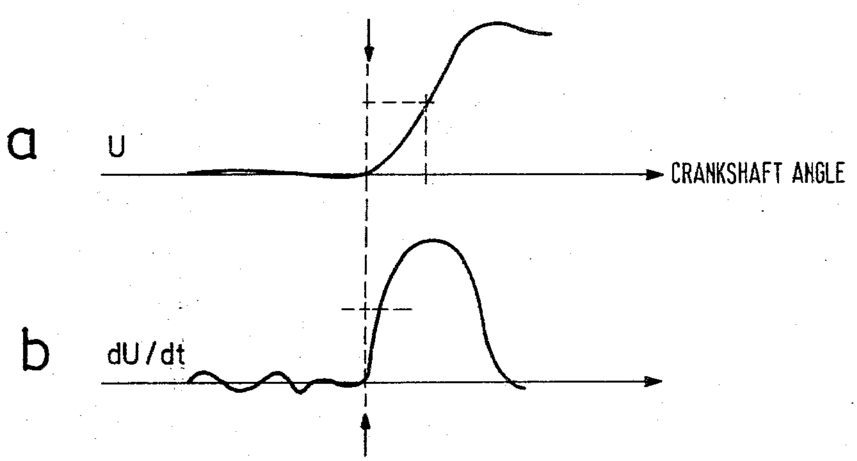
FIG. 2 is a set of curves illustrating the output signals from the elements of the apparatus.

FIG. 2*a* is a diagram illustrating the behavior of the output signal from the transducer circuit 13 as a function of time or crankshaft angle. The moment of the onset of fuel injection is designated with an arrow. It will be seen that the output voltage of the transducer circuit 13 increases relatively slowly after the onset of fuel injection and it will be appreciated that this signal is not immediately usable for triggering a threshold switch. It will be further appreciated that the signal characteristics are due to the physical construction of the transducer which cannot be readily altered to generate a more rapidly increasing signal.

FIG. 2*b* is a diagram illustrating the time derivative of the curve in FIG. 2*a*. It will be seen that the curve shown here increases sharply at the onset of fuel injection due to the fact that the magnitude of the output signal of the transducer circuit 13 changes substantially at this time. If the differentiated signal is applied to the threshold switch, the latter will respond substantially sooner than it would if the non-differentiated signal illustrated in FIG. 2*a* were applied, given the same threshold levels.

The exact thresholds used in the switch 16 must be such as to provide for an adequate protection against spurious disturbances. This factor becomes evident from the curve of FIG. 2*b* in which certain amplitude variations are illustrated prior to fuel injection commencement and these variations are related to the disturbances of the output signal from the transducer circuit 13.

Furthermore, the curve illustrated in FIG. 2*b* also shows the necessity of using a holding circuit 18. Without such a holding circuit, the threshold switch 16 would generate a relatively short pulse and the duration of this pulse would depend on the rate of increase of the output signal of the transducer circuit 13. The holding circuit 18 may be, for example, a monostable mulitvibrator which is triggered into its unstable state and provides an output pulse of a given duration.

However, a timing circuit may also be connected directly behind the threshold switch 16 and might deliver a pulse of fixed duration indicating the onset of fuel injection. In some instances, depending on the construction of the timing circuit, the threshold switch 16 may be entirely omitted.

It will be appreciated that the features of the invention described above would be applicable to process signals from a valve position transducer 12 that generated a signal from the basis of capacitive or piezoresistive sensor elements. The onset of injection may also be detected with the aid of, for example, strain gauges, if a force occurring at the onset of fuel injection is employed to engage the strain gauge and cause a deformation therein.

The foregoing relates to merely preferred embodiments and it will be appreciated that other embodiments and variants thereof are possible within the spirit and scope of the invention.

What is claimed and desired to be secured by Letters Patent of the United States is:

1. A device for detecting the onset of fuel injection in a fuel injection valve of an internal combustion engine including:

a mechanical-electrical transducer associated with said fuel injection valve for generating a first output signal related to the position of the movable valve member in said fuel injection valve, and an electronic processing circuit for processing said signal generated by said transducer, and wherein the improvement comprises a differential circuit connected to said transducer for directly receiving the signal from said transducer and generating therefrom a differentiated signal to be applied to said processing circuit.

2. A device according to claim 1, wherein said mechanical-electrical transducer includes an inductive sensor.

3. A device according to claim 1, wherein said mechanical-electrical transducer includes a capacitive sensor.

4. A device according to claim 1, wherein said mechanical-electrical transducer includes a piezoresistive sensor.

5. A device according to claim 1, wherein said mechanical-electrical transducer includes a strain gauge sensor.

6. A device for detecting the onset of fuel injection in a fuel injection valve of an internal combustion engine including:

a mechanical-electrical transducer associated with said fuel injection valve for generating a first output signal related to the position of the movable valve member in said fuel injection valve, and an electronic processing circuit for processing said signal generated by said transducer, and wherein the improvement comprises a differential circuit connected to said transducer for receiving the signal from said transducer and generating therefrom a differentiated signal to be applied to said processing circuit, further comprising a holding circuit for receiving the output of said differentiating circuit.

7. A device according to claim 6, wherein said holding circuit is a timing circuit.

8. A device for detecting the onset of fuel injection in a fuel injection valve of an internal combustion engine including:

a mechanical-electrical transducer associated with said fuel injection valve for generating a first output signal related to the position of the movable valve member in said fuel injection valve, and an electronic processing circuit for processing said signal generated by said transducer, and wherein the improvement comprises a differentiated circuit connected to said transducer for receiving the signal from said transducer and generating therefrom a differentiated signal to be applied to said processing circuit, wherein said processing circuit includes a threshold switch for receiving the output signal from said differentiating circuit.

9. A device according to claim 8, further comprising a timing circuit for generating a pulse of fixed duration when triggered by the output signal from said differentiating circuit, the output of said timing circuit being applied to said threshold switch.

* * * * *